(12) United States Patent
Ederer et al.

(10) Patent No.: US 8,349,233 B2
(45) Date of Patent: Jan. 8, 2013

(54) MATERIAL SYSTEM AND METHOD FOR CHANGING PROPERTIES OF A PLASTIC COMPONENT

(75) Inventors: Ingo Ederer, Geltendorf (DE); Daniel Günther, München (DE); Johannes Franz Günther, Augsburg (DE)

(73) Assignee: Voxeljet GmbH, Augsburg (DE)

( * ) Notice: Subject to any disclaimer, the term of this patent is extended or adjusted under 35 U.S.C. 154(b) by 138 days.

(21) Appl. No.: 12/681,194

(22) PCT Filed: Oct. 1, 2008

(86) PCT No.: PCT/DE2008/001593
§ 371 (c)(1),
(2), (4) Date: Apr. 1, 2010

(87) PCT Pub. No.: WO2009/046696
PCT Pub. Date: Apr. 16, 2009

(65) Prior Publication Data
US 2010/0244301 A1    Sep. 30, 2010

(30) Foreign Application Priority Data
Oct. 11, 2007   (DE) .................. 10 2007 049 058

(51) Int. Cl.
*B05D 1/18* (2006.01)
(52) U.S. Cl. .............. 264/109; 264/494; 427/430.1
(58) Field of Classification Search ........... 264/128, 264/48, 273, 425; 427/430.1
See application file for complete search history.

(56) References Cited

U.S. PATENT DOCUMENTS

| | | | |
|---|---|---|---|
| 4,247,508 A | 1/1981 | Housholder | |
| 4,352,723 A * | 10/1982 | Morgan | ............. 522/21 |
| 4,369,025 A | 1/1983 | Von Der Weid | |
| 4,575,330 A | 3/1986 | Hull | |
| 4,665,492 A | 5/1987 | Masters | |
| 4,752,352 A | 6/1988 | Feygin | |
| 4,863,538 A | 9/1989 | Deckard | |
| 4,938,816 A | 7/1990 | Beaman et al. | |
| 4,944,817 A | 7/1990 | Bourell et al. | |
| 5,017,753 A | 5/1991 | Deckard | |
| 5,053,090 A | 10/1991 | Beaman et al. | |
| 5,059,266 A | 10/1991 | Yamane et al. | |
| 5,076,869 A | 12/1991 | Bourell et al. | |
| 5,127,037 A | 6/1992 | Bynum | |
| 5,132,143 A | 7/1992 | Deckard | |
| 5,134,569 A | 7/1992 | Masters | |
| 5,136,515 A | 8/1992 | Helinski | |

(Continued)

FOREIGN PATENT DOCUMENTS
AU          720255 B2       5/2000
(Continued)

OTHER PUBLICATIONS

Cima et al., "Computer-derived Microstructures by 3D Printing: Bio- and Structural Materials," SFF Symposium, Austin, TX, 1994.

(Continued)

*Primary Examiner* — Galen Hauth
(74) *Attorney, Agent, or Firm* — Dobrusin & Thennisch PC

(57) ABSTRACT

The instant invention relates to a method for changing characteristics of a plastic component, wherein a medium is introduced into the plastic component, which encompasses a porosity and wherein the medium forms a homogenous compound with the plastic component by at least partially dissolving the plastic component.

18 Claims, 3 Drawing Sheets

U.S. PATENT DOCUMENTS

| | | | |
|---|---|---|---|
| 5,140,937 A | 8/1992 | Yamane et al. | |
| 5,147,587 A | 9/1992 | Marcus et al. | |
| 5,149,548 A | 9/1992 | Yamane et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A | 4/1993 | Sachs et al. | |
| 5,216,616 A | 6/1993 | Masters | |
| 5,248,456 A | 9/1993 | Evans, Jr. et al. | |
| 5,252,264 A | 10/1993 | Forderhase et al. | |
| 5,284,695 A | 2/1994 | Barlow et al. | |
| 5,296,062 A | 3/1994 | Bourell et al. | |
| 5,316,580 A | 5/1994 | Deckard | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,354,414 A | 10/1994 | Feygin | |
| 5,382,308 A | 1/1995 | Bourell et al. | |
| 5,387,380 A | 2/1995 | Cima et al. | |
| 5,431,967 A | 7/1995 | Manthiram et al. | |
| 5,482,659 A | 1/1996 | Sauerhoefer | |
| 5,490,962 A | 2/1996 | Cima et al. | |
| 5,506,607 A | 4/1996 | Sanders, Jr. et al. | |
| 5,555,176 A | 9/1996 | Menhennett et al. | |
| 5,573,055 A | 11/1996 | Melling et al. | |
| 5,597,589 A | 1/1997 | Deckard | |
| 5,616,294 A | 4/1997 | Deckard | |
| 5,639,070 A | 6/1997 | Deckard | |
| 5,639,402 A | 6/1997 | Barlow et al. | |
| 5,647,931 A | 7/1997 | Retallick et al. | |
| 5,658,412 A | 8/1997 | Retallick et al. | |
| 5,730,925 A | 3/1998 | Mattes et al. | |
| 5,740,051 A | 4/1998 | Sanders, Jr. et al. | |
| 5,753,274 A | 5/1998 | Wilkening et al. | |
| 5,807,437 A | 9/1998 | Sachs et al. | |
| 5,851,465 A | 12/1998 | Bredt | |
| 5,902,441 A | 5/1999 | Bredt et al. | |
| 5,902,537 A | 5/1999 | Almquist et al. | |
| 5,943,235 A | 8/1999 | Earl et al. | |
| 5,989,476 A * | 11/1999 | Lockard et al. | 264/401 |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,116,517 A | 9/2000 | Heinzl et al. | |
| 6,133,353 A | 10/2000 | Bui et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,165,406 A | 12/2000 | Jang et al. | |
| 6,193,922 B1 | 2/2001 | Ederer | |
| 6,217,816 B1 | 4/2001 | Tang | |
| 6,259,962 B1 | 7/2001 | Gothait | |
| 6,305,769 B1 | 10/2001 | Thayer et al. | |
| 6,322,728 B1 | 11/2001 | Brodkin et al. | |
| 6,355,196 B1 | 3/2002 | Kotnis et al. | |
| 6,375,874 B1 * | 4/2002 | Russell et al. | 264/28 |
| 6,395,811 B1 | 5/2002 | Nguyen et al. | |
| 6,401,001 B1 | 6/2002 | Jang et al. | |
| 6,403,002 B1 | 6/2002 | Van Der Geest | |
| 6,416,850 B1 | 7/2002 | Bredt et al. | |
| 6,423,255 B1 | 7/2002 | Hoechsmann et al. | |
| 6,436,334 B1 | 8/2002 | Hattori et al. | |
| 6,467,525 B2 | 10/2002 | Herreid et al. | |
| 6,476,122 B1 | 11/2002 | Leyden | |
| 6,500,378 B1 | 12/2002 | Smith | |
| 6,554,600 B1 | 4/2003 | Hofmann et al. | |
| 6,610,429 B2 | 8/2003 | Bredt et al. | |
| 6,713,125 B1 * | 3/2004 | Sherwood et al. | 427/157 |
| 6,733,528 B2 | 5/2004 | Abe et al. | |
| 6,838,035 B1 | 1/2005 | Ederer et al. | |
| 7,004,222 B2 | 2/2006 | Ederer et al. | |
| 7,137,431 B2 | 11/2006 | Ederer et al. | |
| 2001/0050031 A1 | 12/2001 | Bredt et al. | |
| 2002/0026982 A1 | 3/2002 | Bredt et al. | |
| 2002/0111707 A1 | 8/2002 | Li et al. | |
| 2003/0083771 A1 | 5/2003 | Schmidt | |
| 2004/0012112 A1 | 1/2004 | Davidson et al. | |
| 2004/0035542 A1 | 2/2004 | Ederer et al. | |
| 2004/0056378 A1 | 3/2004 | Bredt et al. | |
| 2004/0094058 A1 | 5/2004 | Kasperchik et al. | |
| 2004/0145088 A1 | 7/2004 | Patel et al. | |
| 2005/0017394 A1 | 1/2005 | Hochsmann et al. | |
| 2005/0167872 A1 | 8/2005 | Tsubaki et al. | |
| 2005/0283136 A1 * | 12/2005 | Skarda | 604/526 |
| 2006/0208388 A1 * | 9/2006 | Bredt et al. | 264/123 |
| 2007/0045891 A1 * | 3/2007 | Martinoni et al. | 264/128 |
| 2008/0001331 A1 | 1/2008 | Ederer | |

FOREIGN PATENT DOCUMENTS

| | | |
|---|---|---|
| DE | 4300478 | 8/1994 |
| DE | 4400523 | 7/1995 |
| DE | 4440397 | 9/1995 |
| DE | 19511772 A1 | 10/1996 |
| DE | 19545167 A1 | 6/1997 |
| DE | 19723892 C1 | 9/1998 |
| DE | 19846478 C2 | 4/2000 |
| DE | 19853834 | 5/2000 |
| DE | 10047614 | 4/2002 |
| DE | 60008778 T2 | 2/2005 |
| DE | 69634921 T2 | 12/2005 |
| EP | 0361847 B1 | 4/1990 |
| EP | 0431924 B1 | 6/1991 |
| EP | 0688262 | 12/1995 |
| EP | 0711213 | 5/1996 |
| EP | 0734842 | 10/1996 |
| EP | 0739666 | 10/1996 |
| EP | 0968776 | 1/2000 |
| EP | 1163999 | 12/2001 |
| EP | 1415792 | 5/2004 |
| EP | 1442870 | 8/2004 |
| FR | 2790418 | 9/2000 |
| GB | 2382798 | 6/2003 |
| WO | 95/18715 A1 | 7/1995 |
| WO | 96/05038 A1 | 2/1996 |
| WO | 00/21736 A1 | 4/2000 |
| WO | 00/51809 A1 | 9/2000 |
| WO | 01/26885 A1 | 4/2001 |
| WO | 01/72502 A1 | 4/2001 |
| WO | 01/34371 A2 | 5/2001 |
| WO | 02/26419 A1 | 4/2002 |
| WO | 02/26420 A1 | 4/2002 |
| WO | 02/26478 A1 | 4/2002 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |
| WO | 03/103932 A1 | 12/2003 |
| WO | 2004/010907 A1 | 2/2004 |
| WO | 2004/110719 A2 | 12/2004 |
| WO | 2004/112988 A2 | 12/2004 |
| WO | 2005082603 A1 | 9/2005 |
| WO | 2005/113219 A1 | 12/2005 |

OTHER PUBLICATIONS

EOS Operating Manual for Laser Sintering Machine, Part 1 with Brief Summary, Feb. 22, 2005.

EOS Operating Manual for Laser Sintering Machine, Part 2 with Brief Summary, Feb. 22, 2005.

Sachs et al., "Three-Dimensional Printing: Rapid Tooling and Prototypes Directly from a CAD Model", Massachusetts Institute of Technology, pp. 131-136.

Sachs et al., "Three-Dimensional Printing: Rapid Tooling and Prototypes Directly from a CAD Model", Massachusetts Institute of Technology, pp. 143 & 151, Jan. 1990.

Jacobs et al., 2005 SME Technical Paper, title "Are QuickCast Patterns Suitable for Limited Production?".

Feature Article—Rapid Tooling—Cast Resin and Sprayed Metal Tooling by Joel Segal, Apr. 2000.

Williams, "Feasibility Study of Investment Casting Pattern Design by Means of Three Dimensional Printing", Department of Machanical Enginerring, pp. 2-15, Jun. 1987.

Copending National Phase Application, WO 02/26419, Apr. 4, 2002.

Copending National Phase Application, WO 02/26420, Apr. 4, 2002.

Copending U.S. Appl. No. 11/320,050 (corresponds with PCT WO 02/26420), (US Patent No. 7,137,431), Dec. 28, 2005.
Copending National Phase Application, WO 03/103932, Dec. 18, 2003.
Copending National Phase Application, WO 04/112988, Dec. 8, 2005.
Copending National Phase Application, WO 05/113219, Dec. 1, 2005.
Copending U.S. Appl. No. 11/767,778, filed Jun. 25, 2007 (Published as 2008-0001331), Jun. 25, 2007.
Copending U.S. Appl. No. 10/866,205, (Published as 2005/0017394), Jun. 11, 2004.
International Search Report, WO 04/110719, Jan. 11, 2005.
International Search Report, WO 2005-113219, Dec. 1, 2005.
Gephart, Rapid Prototyping, pp. 118-119, 1996.
Marcus et al., Solid Freedom Fabrication Proceedings, Nov. 1993.
Opposition of Patent No. DE10047614, Jun. 25, 2003.
Opposition of European Patent No. 1322458 B1, Jan. 19, 2005.
International Search Report, PCT/DE00/03324, (Published as WO2002/026419), Jun. 5, 2001.
International Search Report, PCT/DE01/03661, (Published as WO2002/026420), Feb. 28, 2002.
International Search Report, PCT/DE01/03662, (Published as WO2002/026478), Mar. 1, 2002.
Marcus, et al., Solid Freeform Fabrication Proceedings, Sep. 1995, p. 130-33.
US 4,937,420, 06/1990, Deckard (withdrawn)

* cited by examiner

MATERIAL SYSTEM AND METHOD FOR CHANGING PROPERTIES OF A PLASTIC COMPONENT

CLAIM OF PRIORITY

This application is a national phase of PCT application No. PCT/DE2008/001593 filed on 1 Oct. 2008, which claims priority to German Application No. 10 2007 049 058.7 filed 11 Oct. 2007, all of which are incorporated by reference herein.

FIELD OF THE INVENTION

The invention relates to a material system as well as to a method for changing the characteristics of a plastic component.

BACKGROUND

Plastic components encompassing certain porosity are often created in response to the use of generative three-dimensional processes, such as the selective laser sintering or the three-dimensional print process, for example.

A thin layer of a powdery element is applied to a building platform in response to the selective laser sintering as well as in response to a three-dimensional print process. Subsequently, a part of the powder is selectively bonded, for example by means of applying binding material. This selection corresponds to a cut through the component, which is to be attained.

Subsequently, the building platform is lowered by a layer thickness and is provided with a new layer of particulate material, which is also solidified, as is described above. These steps are repeated until a certain desired height of the object has been reached. The imprinted and solidified areas thus create a three-dimensional object. Such a method is known from DE 69634921, for example.

Other powder-based rapid prototyping processes also operate in a similar manner, for example the electron beam sintering, whereby a loose particulate material is solidified selectively by means of a controlled, physical source of radiation.

All of these methods will be combined herein below under the term "generative three-dimensional processes".

The components produced by means of generative three-dimensional processes oftentimes encompass certain porosity. For the most part, the porosity of the components is conditional on the method of the selective bonding. The connection by means of a laser beam corresponds to the sufficiently known sintering. The grains of the powder connect at their contact points by fusing together. The space between the grains remains open. The conditions of components, in the case of which the selective hardening is realized by metering a liquid (three-dimensional printing), are similar. A porous body is created in the event that the smallest possible quantity of liquid is metered as compared to the powder mass per unit of space. This is known from DE 60008778, for example.

Inadequate mechanical strength properties and disadvantageous surface characteristics are oftentimes problematic for the use of such porous components.

Similar to the known method for creating fiber reinforced materials, the absorptive capacity of porous parts makes it possible to introduce liquid media into the component.

It is thus known from DE 195 45 167 A1, for example, to cover a pattern, which is produced by means of selective laser sintering, with wax, so as to create a closed surface. Subsequent dipping processes in liquid shaped material require a liquid-tight part, so as to ensure the contour accuracy of the mold. What is important here are the strength characteristics. The method uses the thermal phase transition from solid to liquid and vice versa.

Disadvantageous the component must be subjected to considerable temperatures, depending on the infiltration material. In most cases, infiltration materials comprising a low melting point furthermore also encompass low mechanical properties.

In particular the characteristics of the used materials must be considered in response to the configuration of prototypes by means of the above-mentioned generative methods.

For example, it is known to use resins for the infiltration. The resins are introduced into the porous body in the form of a liquid and solidify in the component in the form of dispersion by evaporating the solvent or as resin mixtures by means of a polymerization. Such methods are known from WO 2005/82603 A1, from U.S. Pat. No. 6,375,874 and from U.S. Pat. No. 5,616,294, for example. Due to the necessity for the evaporation of the solvent, such dispersions described in these documents are only suitable for components comprising thin wall thicknesses. Due to the temperature sensitivity for porous plastic components, thermal methods following the example of wax infiltration are not very suitable to increase the strength.

For the most part, polymerizing mixtures for infiltrating are two-component systems, such as epoxy resins. Such mixtures attain high mechanical strength properties. However, they do not come close to the characteristics of commercially polymerized products, such as PE, PET, PMMA, etc., for example.

Polymerizing mixtures, as they are known from the state of the art, have the following limits.

The polymerizing infiltrate together with the porous component or also with the matrix, forms a composite material, which is weakened by the phase limits in the interior. The mechanical properties of the components thus always lie below values of the pure infiltrate.

Furthermore, one binding element and one resin element are typically mixed with one another prior to the introduction into the component in response to the use of a two-element system. The polymerization then begins in a time-delayed manner. It is a disadvantage of this method that once a mixture has been prepared, it must be processed within a short period of time. A dipping process, which provides for high quantities and for a high degree of automation, can thus not be realized in an economical manner. For the most part, the application is carried out by means of a brush. This method cannot be automated and requires high degree of effort in the case of complex geometries.

SUMMARY OF THE INVENTION

It is thus the objective of the present invention to provide a method and a material system to increase mechanical properties of a porous plastic component.

This objective is solved by means of a method for changing characteristics of a plastic component, in the case of which a medium, which encompasses a porosity, is introduced into the plastic component, and the medium forms a homogenous compound with said plastic component by at least partially dissolving it.

The objective may be furthermore solved by means of a material system comprising a medium for introducing into a plastic component encompassing a porosity, in the case of which the medium encompasses at least one substance, which at least partially dissolves the plastic component and which forms a homogenous compound therewith.

In particular in the case of generative three-dimensional methods, such as the three-dimensional print process, high volume outputs can be attained, when porous components are configured intentionally.

The characteristics of the component can be improved specifically by an infiltration after the three-dimensional configuration, such as the printing, for example. The creation of porous components, which are subsequently infiltrated, is furthermore considerably less time-intensive than the creation of components comprising a very high liquid introduction, which is necessary to directly create leak-proof parts in the generative method.

The mechanical properties of infiltrated components, which can be attained, according to methods of the state of the art, are oftentimes too low for prototypes, because the porous component hereby forms a type of matrix and because the infiltrate fills the cavities. This leads to a so-called inner notching effect between the matrix and the infiltrate at the bounding surfaces, which furthermore represents a considerable unstableness factor. The strengths of the components thus vary highly. In addition, infiltration methods known from the state of the art are very labor-intensive and thus represent a serious production bottleneck.

According to the instant invention, materials, which can slightly dissolve the generatively created matrix and which thus lead to a particularly homogenous material, are now used for the infiltration. Slightly dissolving thus means that a homogenous compound between the matrix and the medium, in particular infiltrate, is formed.

Accordingly, pursuant to a first aspect of the present invention, there is contemplated a method for changing characteristics of a plastic component, wherein medium is introduced into the plastic component, which encompasses a porosity, and the medium forms a homogenous compound with said plastic component by at least partially dissolving it The first aspect of the present invention may be further characterized by one or any combination of the features described herein, such as a solidification of the introduced medium takes place by means of polymerization; an outermost layer of the plastic component is solidified in an accelerated manner by means of chemical and/or physical measures as compared to the remaining plastic component; the accelerated solidification of the outermost layer takes place with the use of two polymerization systems comprising different reaction times; the accelerated solidification of the outermost layer takes place by means of the introduction of high-energy radiation; UV radiation is used as high-energy radiation; the introduction of the medium into the plastic component takes place by means of dipping into a vat of the medium; the plastic component is furthermore dipped into a vat comprising an accelerator for hardening the outermost layer; the component is rotated at least in response to the introduction of medium and/or high-energy radiation; the rotation can take place about one or a plurality of axes.

Accordingly, pursuant to a second aspect of the present invention, there is contemplated a material system comprising a medium for introduction into a plastic component encompassing a porosity, wherein the medium encompasses at least one substance, which at least partially "dissolves" the plastic component and which forms a "homogenous" compound therewith.

The second aspect of the present invention may be further characterized by one or any combination of the features described herein, such as the medium is a monomer; the medium encompasses at least one part, which is from the same substance class as a plastic part of the plastic component; provision is further made for a catalyst and/or a wetting agent; provision is further made for a photo initiator; the photo initiator is provided in the medium; the plastic component and the medium encompass a methacrylate; for infiltrating porous plastic components; for infiltrating of plastic components, which are produced by means of three-dimensional print processes.

DETAILED DESCRIPTION OF THE INVENTION

Figure 1:
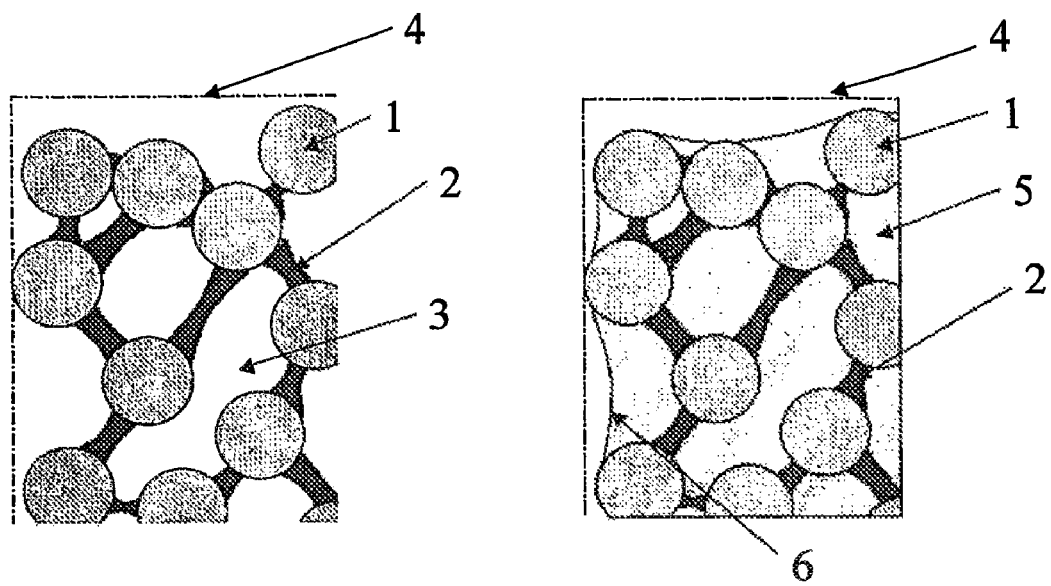
FIG. 1 shows an non-infiltrated and infiltrated matrix.

According to a preferred embodiment of the method according to the invention, the solidification of the introduced medium takes place by means of polymerization.

According to a particularly preferred embodiment of the instant invention, it can be advantageous for an outermost layer of the plastic component to be solidified in an accelerated manner by means of chemical and/or physical measures as compared to the remaining plastic component.

Through this, it may be possible to efficiently prevent a possible loss of geometric shape caused by a softening of the components in response to the connection of the component to the medium.

The component is thereby solidified in an accelerated manner in the outermost layer as compared to the remaining component volume and a stable structure is thus created. The softening caused by the slight dissolution of the matrix may thus not impact the geometry. The outermost layer solidification could take place, for example, by additionally applying accelerators and with the use of polymerization media comprising radiation initiation.

"outermost layer" according to the instant invention refers to the outer area of the component.

"Accelerated" could be defined in such a manner that a solidification of an outermost layer occurs in a noticeably more rapid manner than a solidification of the remaining body.

"Solidification" shall not be understood to mean that a complete solidification has taken place. In terms of the invention, a solidification that allows for the form stability, that is, a stability that supports the dead weight, is oftentimes sufficient.

According to an embodiment of the instant invention, the accelerated solidification of the outermost layer could take place with the use of two polymerization systems comprising different reaction times.

In addition, it could also be advantageous when the accelerated solidification of the outermost layer is reached with the introduction of high-energy radiation, such as UV radiation or microwave radiation, for example.

A further embodiment of the method according to the invention represents the possibility of introducing the medium into the plastic component by means of dipping into a vat of the medium.

The porous component could thereby now be automatically infiltrated in a dipping vat. The dipping vat itself does not harden, so that a permanent and economical use of the dipping vat is ensured.

However, the liquids of the dipping vat result in high strength characteristics after the polymerization. The material of the porous component forms a compound with the infiltrate, which is similar to a homogenous material. The hardening of the resin should advantageously take place within a period of a few minutes.

In the case of the method according to the invention, the plastic component can furthermore be dipped into a vat comprising an accelerator according to a preferred embodiment for hardening the outermost layer.

According to the present invention it can furthermore be advantageous when the component is rotated at least in response to the introduction of medium and/or high-energy radiation.

This rotation could thereby take place about one or a plurality of axes.

According to a particularly preferred embodiment, provision could be made for a rotary table comprising one or a plurality of degrees of freedom for moving the component. To ensure the influx of the radiation in response to the use of the radiation curing, the component is held in a bracket, for example made of wires, which shields as little radiation as possible. A grate, which is connected to an axis of rotation, represents a simple embodiment.

A material system according to the instant invention comprises a medium for introduction into a plastic component, which encompasses a porosity. The medium thereby encompasses at least one substance, which at least partially dissolves the plastic component and which forms a homogenous compound therewith.

Preferably, the medium is hereby a monomer.

According to a particularly preferred embodiment, the medium encompasses at least one part, which is from the same substance class as a plastic part of the plastic component.

Preferably, a monomer is included in the medium as material. Said monomer is also a part of the bond bridges or of the grains of the matrix, thus of the plastic component, or a foreign monomer, which, however, slightly dissolves the generatively created body. Due to the slight dissolution by means of the liquid, the generatively created body solidifies in a homogenous manner.

Due to the similarity of its characteristics with the base material of the plastic component, such a medium or infiltrate can penetrate particular deep into the component. Excess material drips off the component and does not leave behind surface flaws. In the event that a component of the polymerizing material is introduced during the generative creation of the component, a dipping process could preferably also be realized by means of a long term dipping vat.

According to an embodiment of the instant invention, the material system furthermore encompasses a catalyst and/or a cross linking agent.

It can moreover be advantageous when provision is further made for a photo initiator.

It could thereby be the case that provision is made for the photo initiator in the medium.

According to an embodiment of the material system, the plastic component and the medium encompass a methacrylate.

The material system according to the invention as well as the method according to the invention can preferably be used for infiltrating porous plastic components, in particular plastic components produced by means of three-dimensional print processes.

To elaborate in more detail, the invention will be described in more detail below by means of preferred exemplary embodiments with reference to the drawing.

According to the instant invention, a medium 5 is to be introduced into a plastic component 10. A porous component 10 forms the basis for this.

As can be seen in FIG. 1, a porous component 10 or the matrix 4, respectively, are formed by grains 1 and by connecting bridges 2 and the cavities 3 or pores, respectively, of the matrix 4 are located between the grains 1.

The instant invention relates to bodies, the grains of which consist of plastic. The bridges 2 of the matrix 4 can consist of a material, which is similar or not similar to the grains 1.

The connecting bridges 2 between the grains 1 can be created by means of different methods in response to the formation of the plastic component 10 or matrix 4, respectively. In the case of components, which have been produced by means of the laser sintering process, the bridges 2 are created from molten material, which is created by means of the heat exposure of the laser beam. This means that the bridges 2 are formed from the material of the grains 1.

By means of three-dimensional print methods, bridges 2 can be formed from the material of the grains 1, for example by metering a solvent, as well as from a further material, for example by introducing a polymerizing liquid.

Preferably, porous plastic component are used, in the case of which the bridges 2 and the material of the grains 1 belong to a chemically similar plastic system.

The porosity of the component can be controlled within certain limits via the temperature control in response to the laser sintering process and via the metered quantity of the bonding agent in response to the three-dimensional printing.

Preferably, a liquid medium is used according to the invention, the chemical composition of which corresponds to the material system of grains 1 and bridges 2. After the wetting of the porous body, the medium 5 permeates into the cavities 3 by means of a capillary effect. A leak-proof body is created by means of the solidification of the medium or of the infiltrate 5, respectively.

Excess material 5 drips off from the surface 6 of the component 10 after the solidification and the plastic component has a smoother surface than in the non-infiltrated state.

Figure 2:
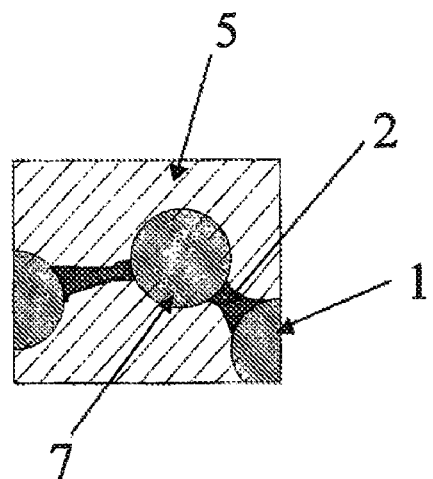
FIG. 2 shows an infiltrated matrix according to an embodiment of a method and of a material system of the instant invention.

It is illustrated in FIG. 2 that according to the instant invention, it has proven to be advantageous for attaining high strengths for the medium 5 to encompass a separation force relative to the matrix 4. Said separation force should be considerable. By means of such a medium 5 it is possible to slightly dissolve 7 the grains 1 and bridges 2 and to thus form a homogenous compound in response to the solidification.

Preferably, the medium 5 encompasses monomers, which solidify in or with the component 10, respectively, if applicable with the addition of auxiliary materials by forming molecular chains/structures.

The polymerization can thereby take place by means of the reaction types polyaddition, polycondensation, radical and ionic polymerization or ring opening polymerization. Depending on the purpose of application, homopolymers, as a chain of a monomer, or copolymers can be used by means of the polymerization of different monomers.

The used monomers preferably encompass a low viscosity. Depending on the reaction type, the medium 5 includes further components in addition to different monomers. Among others, reaction-initiating initiators, accelerating catalysts and strength-increasing wetting components can be added to the medium 5. These substances can furthermore be used to control the reaction process. In addition, reaction-inhibiting substance-inhibitors can be included.

The components, which are necessary to form a polymerizing substance, can be introduced in separate phases of the work piece creation. Initiating components or catalysts in the powder or the grains 1, respectively, or the bridges 2 of the component 10 can be introduced in response to the generative construction process. These components can fulfill a chemical function either in the construction process and in response to the infiltration or two separate systems are realized.

Figure 3:
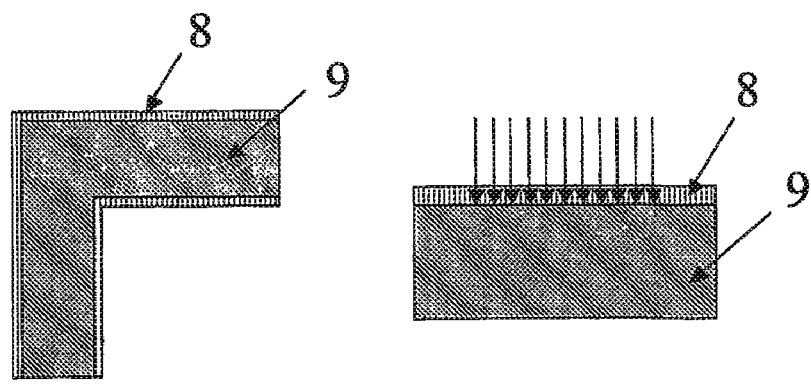
FIG. 3 shows an outermost layer hardening according to a preferred embodiment of the instant invention.

According to a preferred embodiment of the invention, as is shown in FIG. 3, a slight matrix dissolution is carried out in response to the method according to the invention and a stabilization of the outermost layer 8 of the component 10 is created. Preferably, this is attained by means of two polymerization systems, which react in a chronologically separate manner. The rapid system generates a thin, solid outermost layer 8 in preferably only a few seconds.

Due to the fact that the reaction heat causes the temperature in the component to increase to a high degree in response to a rapid, complete hardening of the component 10, a thermal softening of the component can occur. The second reaction, which solidifies the main part or the "inner" part, respectively, of the material volume 9 (main reaction), thus takes place within a larger time frame.

An initiating system, which is bound in the powdery material or which is present on the surface thereof, which is thus introduced during the generative creation of the component, is preferred for the second polymerization reaction.

A system, in the case of which the powdery material, which forms the porous component, consists of polymethylmethacrylate (PMMA) or polyethylmethacrylate (PEMA) is particularly preferred. The grain contains the initiator benzoyl peroxide (BPO). The BPO can be made accessible for the reaction via the dissolving effect of the monomer in the infiltration liquid as compared to the grain.

A system for initiating by means of ethyl barbituric acid is likewise preferred. A PMMA or PEMA grain is coated therewith.

An element (initiator or catalyst/accelerator), which is required for the independent hardening, is missing in the liquid for infiltrating, the medium 5. The infiltrate 5 thus only hardens in contact with the component 10. It can thus be kept ready in a vat for an automated dipping infiltration.

A mixture of a monomer or a monomer mixture and a catalyst is preferred for the infiltration. In addition, a wetting agent can be added. Monomers comprising a low viscosity are particularly suitable here. Together with the initiator in the component, the result is a mixture, which can be polymerized.

A mixture of 2-hydroxyethylmethacrylate (HEMA) and N,N-dimethyl-p-toluidine (DMPT) is particularly preferred. HEMA thereby acts as monomer and DMPT acts as catalyst, which accelerates the initiation by the BPO from the grain.

Wetting agents are added to control the reaction heat in response to the main solidification. Ethyleneglycol-dimethylmethacrylate (EGDMA), which reduces the reaction speed under certain reaction conditions, is preferred.

A mixture of HEMA and copper-acetyl-acetonate (CuAA) is likewise preferred. Through this, a system comprising ethyl barbituric acid-coated grains can be initiated.

The accelerated solidification of the edge area 8 can be attained in different ways. On the one hand, a liquid component can be used. Said liquid component can contain an initiator or catalyst in a high quantity, as compared to the actual infiltration mixture. On the other hand, a component, which can be activated by means of irradiation, can be added to the infiltration mixture. Furthermore, one component can be available in a gaseous form and can thus evenly come in contact with all of the edges of the component.

The use of a liquid component takes place in an additional dipping step, which follows the actual infiltration. In the case of the additional liquid, a catalyst or an initiator can be used. The catalyst DMPT in the case of a grain comprising BPO and/or CuAA is preferred for the outermost layer hardening by means of a liquid in the case of an ethyl barbituric acid system, into which the component is dipped. Due to the low diffusion in the component, only one outermost layer is solidified when proceeding in this manner.

Figure 6:
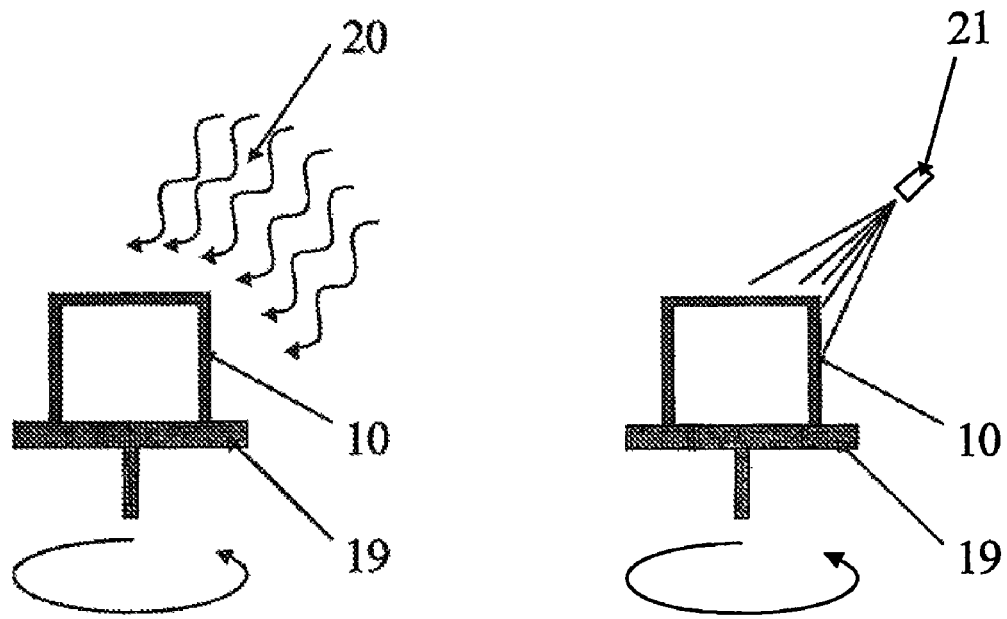
FIG. 6 shows the irradiation of the component according to a preferred embodiment of the instant invention and a spray coat method for applying a liquid according to a preferred embodiment of the instant invention.

As is shown in FIG. 6, the wetting of the outermost layer 8 can be carried out by means of a jet spray system instead of by means of a dipping method. For this purpose, the component 10 is rotated on a rotary table 19, for example. One or a plurality of spray nozzles 21 generate a mist from the liquid component so as to activate the polymerization of the outermost layer.

As an expansion of the above-mentioned system (polymerization system comprising two different initiator concentrations), a polymerization system comprising a plurality of independent initiator systems can be used to better control the individual desired reactions. A grain, which is coated with ethyl barbituric acid and which contains BPO in the interior, represents one exemplary embodiment. By adding the catalysts CuAA or DMPT, a system can now specifically be made to react. In addition, a photo initiator can also serve as a second initiation system.

A photo initiator of the type diphenyl (2,4,6-trimethylbenzoyl)phosphine oxide (TPO) is preferred for the radiation hardening. With the help of this initiator, radicals for the polymerization can be generated by means of UV radiation. All of the radiation types of UVA, UVB to UVC can be used. UVA radiation is preferred for the hardening.

Figure 4:
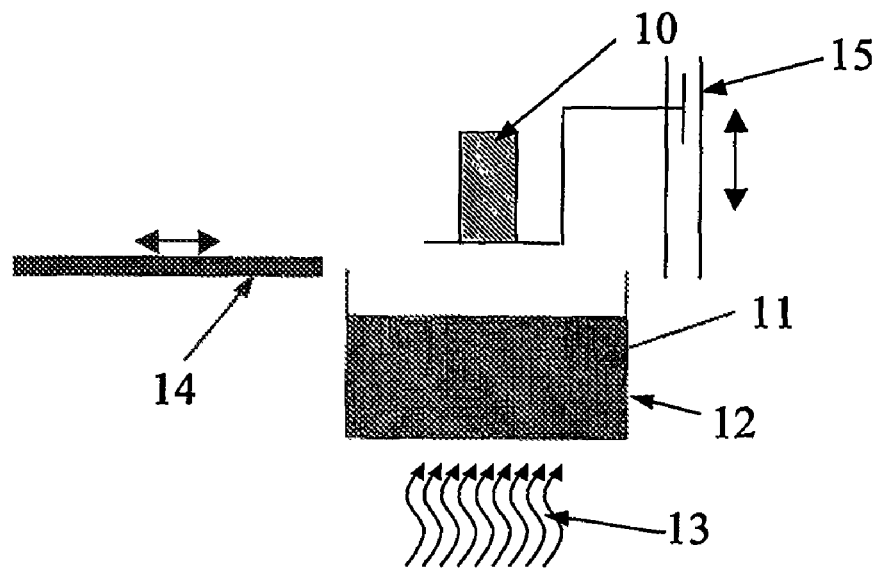
FIG. 4 shows a dipping vat according to a preferred embodiment of the instant invention.

For the infiltration, see FIG. 4, the component 10 is dipped into a vat 12 comprising the liquid components 11. All of the elements, which form a mixture that is capable of reaction and polymerization with the element in the component 10, are located in the vat. The essential demand on the mixture is for the elements in the vat without the element in the component to not react and solidify or to only slowly react and solidify.

According to the above explanations, an infiltration mixture consisting of 79% HEMA, 20% EGDMA, 0.5% DMPT, 0.5% TPO is particularly preferred.

Figure 5:
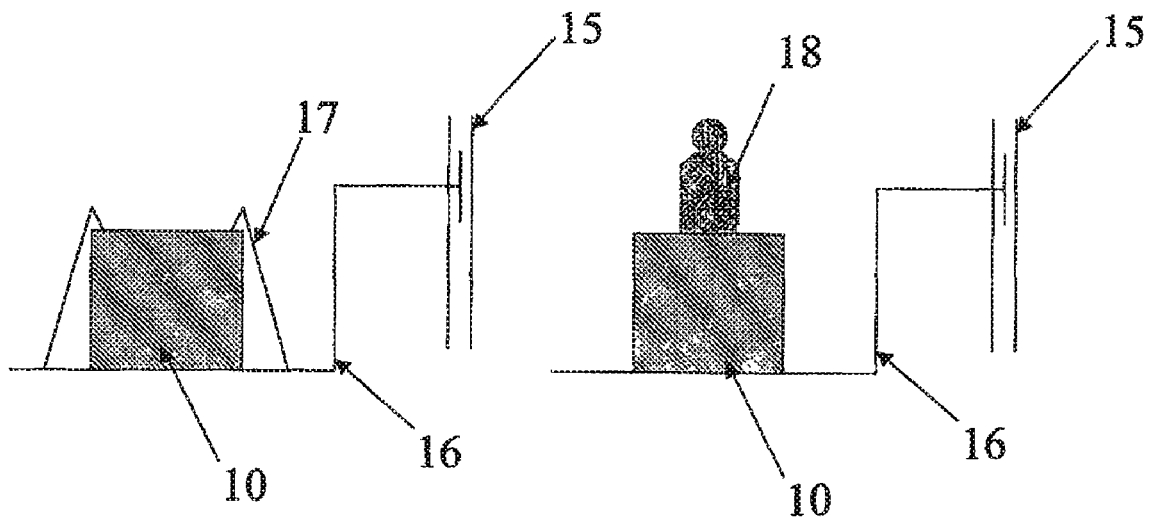
FIG. 5 shows a dipping vat according to a further preferred embodiment of the instant invention.

The device for dip infiltration includes a vat 12, a liquid-permeable bracket 16 for dipping and a hold-down device 17, 18, which prevents the floating of the component in the dipping vat (see FIGS. 4 and 5).

The dipping vat consists of a chemically resistant container 12. High-grade steel is preferred. Depending on the infiltration medium, it can be heated for lowering the viscosity of the infiltrate 13. A seal 14 protects the vat from contamination and from radiation ingress, which can lead to an undesired polymerization. The cooling device 13, which provides for a particularly high degree of conservation of the infiltration fluid, represents an expansion.

A cage made of wire is preferred for the liquid-permeable bracket 16. Retainer clips 17 or a weight 18 are located on said cage for holding down the component. An axis for lowering 15 provides for an automatable and even dipping of the components.

FIG. 6 shows the hardening of the outermost layer by means of UV radiation 20. The selection of the process parameters thus takes place in such a manner that only a very thin layer is solidified in the edge region. A distortion caused by a high degree of internal stresses is thus avoided. For this purpose, 0.5% by weight of TPO is located in the monomer mixture. The exposure takes place by means of UVA radiation tubes comprising an input power of 75 W in a distance of 10 cm.

To compensate for inhomogeneities of the UV radiation source, the component is moved in the radiation field. The movement provides for the access of UV radiation to otherwise shadowed areas. The movement can take place by rotation about all of the spatial dimensions. A rotation about only one axis is preferred.

A rotary table 19 comprising one or a plurality of degrees of freedom is preferred for moving the component. To ensure the influx of the radiation, the component is held in a bracket made of wires, which encompass the smallest possible cross section. A grate, which is connected to an axis of rotation, represents a simple embodiment.

Figure 7:
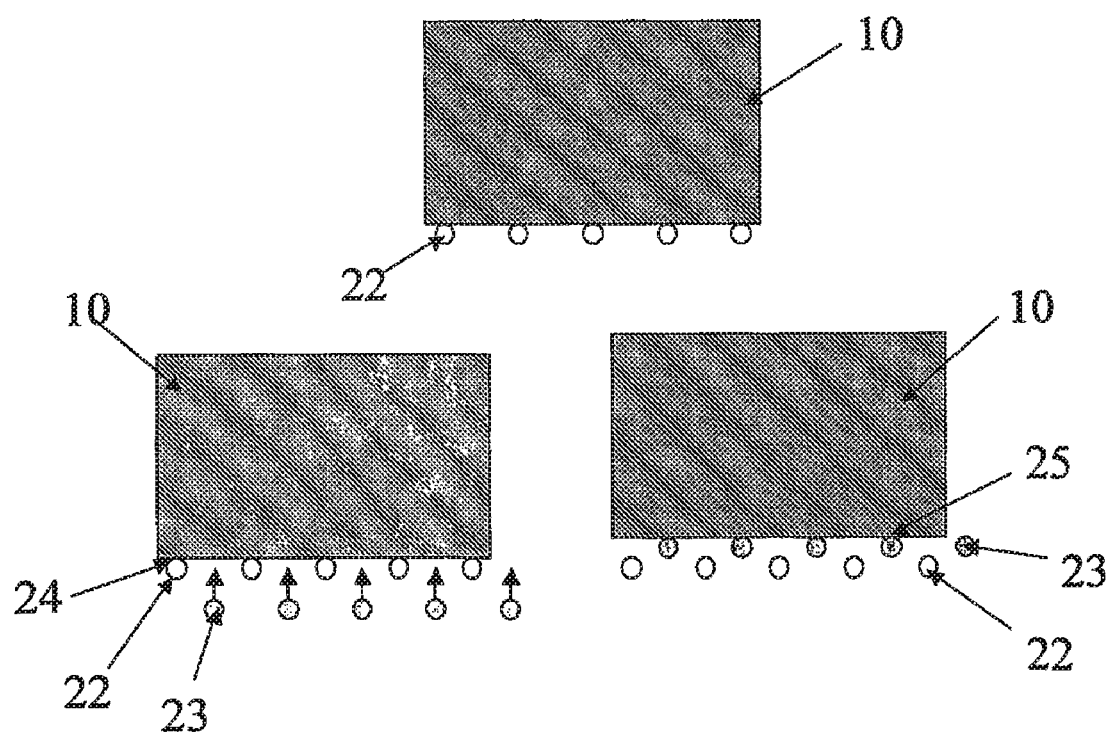
FIG. 7 shows a bracket according to a preferred embodiment of the instant invention.

To prevent an adhesion of the components to the wire rack, provision can be made for a special device. The supporting points of the component 10 are thereby changed in a chronological sequence by means of movement. A simple embodiment illustrated in FIG. 7 illustrated two grates 22, 23, which are integrated into one another. One grate is thereby displaced against the second grate in its height. The component is thus taken over by the respective higher grid and the supporting points change 24, 25.

What is clamed is:

1. A method comprising:
   bonding synthetic particles together to form a plastic component having a porosity;
   changing characteristics of the plastic component after the plastic component is formed by introducing a medium into the plastic component,
   wherein the medium forms a homogenous compound with said plastic component by at least partially dissolving the plastic component.

2. The method according to claim 1, wherein a solidification of the introduced medium takes place by means of polymerization.

3. The method, according to claim 1, wherein an outermost layer of the plastic component is solidified in an accelerated manner by, means of chemical and/or physical measures as compared to a remaining portion of the plastic component.

4. The method according to claim 3, wherein the accelerated solidification of the outermost layer takes place with the use of two polymerization systems comprising different reaction times.

5. The method according to claim 4, wherein the accelerated solidification of the outermost layer takes place by means of introduction of high-energy radiation.

6. The method according to claim 5, wherein UV radiation is used as high-energy radiation.

7. The method according to claim 1, wherein introduction of the medium into the plastic component takes place by means of dipping into a vat of the medium.

8. The method according claim 1, wherein the plastic component is furthermore dipped into a vat comprising an accelerator for hardening the outermost layer.

9. The method according to claim 1, wherein the component is rotated at least in response to the introduction of medium and/or high-energy radiation.

10. The method according to claim 9, wherein the rotation can take place about one or a plurality of axes.

11. The method according to claim 1, wherein the method includes a step of infiltrating the porous plastic component.

12. The method according to claim 1, wherein the method includes a step of infiltrating the plastic component, which are produced by means of a three-dimensional print processes.

13. The method according to claim 1, wherein the medium is a monomer and the medium encompasses at least one part, which is from a same substance class as a plastic part of the plastic component;
   wherein a provision is further made for a catalyst and/or a wetting agent;
   wherein a provision is further made for a photo initiator and the photo initiator is provided in the medium; and
   wherein the plastic component and the medium encompass a methacrylate.

14. A method comprising:
   a. assembling synthetic particles into a three-dimensional plastic component using a three-dimensional printing process or a laser sintering process;
   b. controlling porosity of the three-dimensional plastic component during assembly of the synthetic particles;
   c. introducing a medium into the three-dimensional plastic component after the step of assembling is complete so that the medium at least partially dissolves the three-dimensional plastic component;
   d. solidifying an outermost layer of the plastic component by subjecting the outermost layer to UV radiation so that a geometry of the three-dimensional plastic component is not lost;
   e. rotating the three-dimensional plastic component so that shadowed areas of the three-dimensional plastic component are solidified; and
   f. solidifying an inner part of the three-dimensional plastic component after the outermost layer has begun solidification;
   wherein polymerization occurs between the three-dimensional plastic component and the medium forming a homogenous compound in response to the solidification.

15. The method according to claim 14, wherein the method includes the step of removing excess medium by allowing the excess medium to drip off of the three-dimensional plastic component.

16. The method according to claim 15, wherein the step of introducing a medium into the three-dimensional plastic component includes the steps of:
   i. securing the three-dimensional plastic component in a liquid-permeable bracket for dipping the plastic component in a vat of the medium;
   ii. attaching retainer clips or a weight on the liquid-permeable bracket so that the three-dimensional plastic component is prevented from floating
   iii. dipping the three-dimensional plastic component in the vat of the medium.

17. The method according to claim 10, wherein the method includes the step of removing excess medium by allowing the excess medium to drop off of the plastic component.

18. The method according to claim 7, wherein the method includes the step of securing the plastic component in a liquid-permeable bracket for dipping the plastic component and so that the plastic component is prevented from floating in the vat.

* * * * *